(12) United States Patent
Derstine et al.

(10) Patent No.: US 7,895,944 B2
(45) Date of Patent: Mar. 1, 2011

(54) BALING SYSTEMS AND METHODS

(76) Inventors: Trevor Derstine, Harrisburg, OR (US);
Nevine Derstine, Harrisburg, OR (US)

(*) Notice: Subject to any disclaimer, the term of this patent is extended or adjusted under 35 U.S.C. 154(b) by 386 days.

(21) Appl. No.: 12/079,158

(22) Filed: Mar. 24, 2008

(65) Prior Publication Data

US 2009/0235628 A1    Sep. 24, 2009

(51) Int. Cl.
*B30B 9/30*        (2006.01)
*B30B 15/18*       (2006.01)
*B30B 15/22*       (2006.01)

(52) U.S. Cl. .............. 100/45; 100/50; 100/97; 100/98 R; 100/216; 100/218; 100/246

(58) Field of Classification Search ............. 100/3, 43, 100/45, 48, 94, 96, 97, 98 R, 215, 218, 232, 100/240, 246, 245, 50, 216; 56/10.2 R, 341, 56/343, DIG. 15; 700/50, 56, 275
See application file for complete search history.

(56) References Cited

U.S. PATENT DOCUMENTS

| 5,913,801 | A  | * | 6/1999  | Bottinger et al. ......... 56/10.2 R |
| 6,026,742 | A  | * | 2/2000  | Bei ........................ 100/318 |
| 6,339,986 | B1 | * | 1/2002  | Van Hierden ................. 100/6 |
| 7,140,170 | B2 | * | 11/2006 | Krone et al. .................. 56/341 |
| 2005/0235841 | A1 | * | 10/2005 | Hel ............................ 100/43 |

* cited by examiner

*Primary Examiner* — Jimmy T Nguyen
(74) *Attorney, Agent, or Firm* — Mohr IP Law Solutions, P.C.

(57) ABSTRACT

Bailing systems and methods for bailing a material into bales. The bailing systems may include a movement mechanism, a compactor disposed downstream of the movement mechanism and a controller in wired or wireless communication with the movement mechanism and the compactor. In some examples, the movement mechanism includes an arm, a first sensor configured to collect dynamic arm position data, and a second sensor configured to collect dynamic movement parameter data. In some examples, the controller includes instructions for determining the length of the material by comparing dynamic arm position data and dynamic movement parameter data. In some examples, the compactor includes a ram, a block, and an actuator configured to move the block between a passageway position and a ram position.

20 Claims, 5 Drawing Sheets

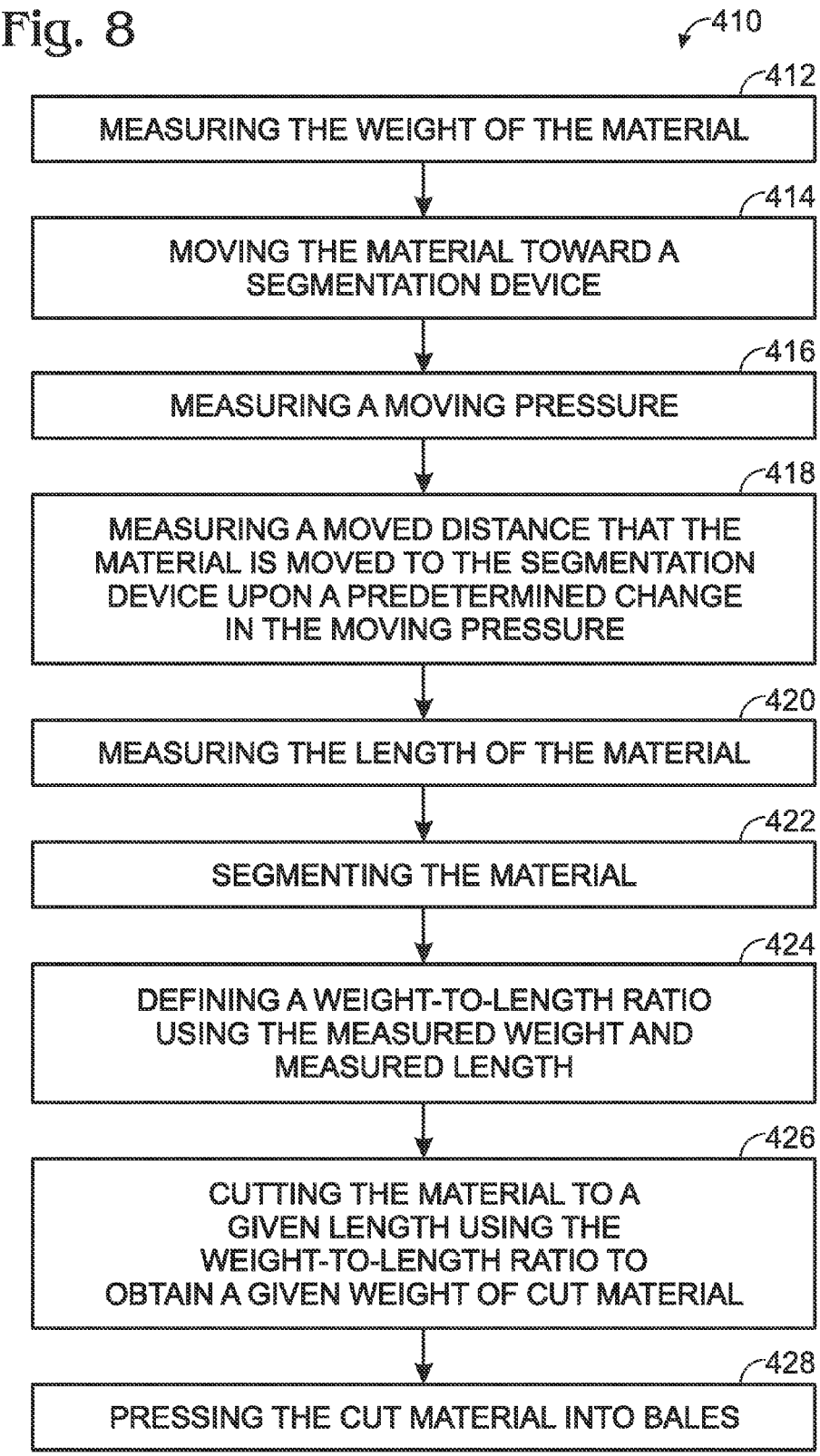

BALING SYSTEMS AND METHODS

BACKGROUND

Baling systems and methods are used in a variety of agricultural and industrial packaging applications. Bailing generally relates to the bundling and binding of a material for storage or transport. Agricultural packaging applications include the baling of agricultural products, including hay and straw among others. Industrial packaging applications including the baling of plastic, paper, and/or cardboard for transport to recycling facilities.

Bailing systems and methods known heretofore have not adequately addressed the need for efficient control of the final parameters of baled materials, such as the weight of the baled material. Further, there exists a need for more efficient and uninterrupted acquisition of relevant material parameters, such as the length of a material, as the material is being baled. Moreover, known bailing systems and methods do not provide sufficiently efficient and reliable means for bundling material into bales.

SUMMARY

Bailing systems and methods for bailing a material into bales are disclosed. The bailing systems may include a movement mechanism, a compactor disposed downstream of the movement mechanism, and a controller in wired or wireless communication with the movement mechanism and the compactor. In some examples, the movement mechanism includes an arm, a first sensor configured to collect dynamic arm position data, and a second sensor configured to collect dynamic movement parameter data. In some examples, the controller includes instructions for determining the length of the material by comparing dynamic arm position data and dynamic movement parameter data. In some examples, the compactor includes a ram, a block, and an actuator configured to move the block between a passageway position and a ram position.

BRIEF DESCRIPTION OF THE DRAWINGS

FIG. 8 is a flow chart of a further method of bailing a material into bales.

DETAILED DESCRIPTION

Baling systems and methods disclosed in the present disclosure will become better understood through review of the following detailed description in conjunction with the drawings and the claims. The detailed description, drawings, and claims provide merely examples of the various inventions described herein. Those skilled in the art will understand that the disclosed examples may be varied, modified, and altered without departing from the scope of the inventions as defined in the claims, and all equivalents to which they are entitled. Many variations are contemplated for different applications and design considerations; however, for the sake of brevity, each and every contemplated variation is not individually described in the following detailed description.

Throughout the following detailed description, a variety of examples of bailing systems and methods are provided. Related reference numbers (e.g., 12, 112, and 212) will be used for related features in each example. Related features may be identical, similar, or dissimilar in different examples. For the sake of brevity, related features will not be redundantly explained in each example. Instead, the use of related numbers will cue the reader that the feature with a related number may be similar to the related feature in an example explained previously. Any example specific features will be described in detail in that example. The reader should understand that a given feature need not be the same or similar to the specific portrayal of a related feature in any given figure or example.

Figure 1:
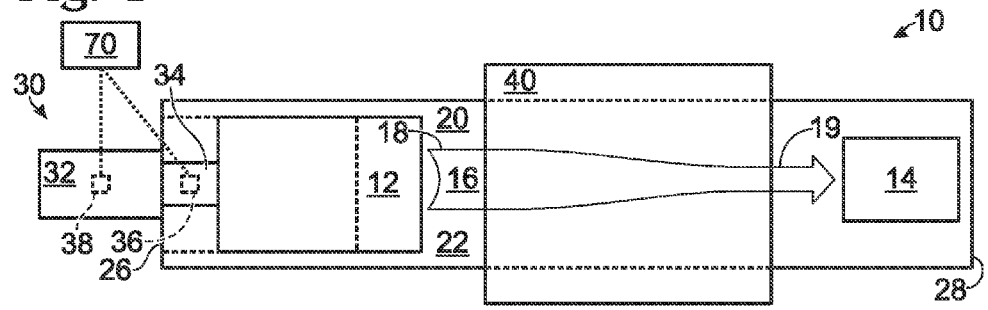
FIG. 1 is a schematic plan view of a bailing system including a movement mechanism and a compactor.

As shown in FIG. 1, a bailing system 10 for bailing a material 12 into bales 14 may include a platform 20, a movement mechanism 30, a compactor 40, and a controller 70. A path 16 may be defined in which material 12 moves between components of bailing system 10. As material 12 moves along path 16, it may be described as moving from an upstream position 18 to a downstream position 19.

In the present application, baling refers generally to bundling material into bales 14. In some examples, such as with bailing system 10 shown in FIGS. 1 and 2, material 12 is compressed into bales 14. A suitable binding member (not pictured), such as twine, rope, cord, paper, or plastic wrap, or the like may be used to bind bales 14. Binding bales 14 may be accomplished manually or through the use of automated binding machinery known in the art.

Material 12 may be any type of material that a user may wish to bundle into bales 14, such as for the purpose of storing, transporting, or subsequently processing the material. Material 12 may be hay, straw, paper, plastic, wire, tubing, or cardboard, among many others. In some examples, material 12 is compressible, while in other examples, material 12 is substantially non-compressible. Material 12 may be loose or unsecured, or it may be bound, packaged, or secured in some manner.

Platform 20 may support material 12 as it moves along path 16. Platform shown to be supporting material 12 in FIGS. 1 and 2 includes a surface 22 facing material 12 and supports (not shown) extending from the ground to support surface 22. Platform 20 may include an upstream end 26 and a downstream end 28. In some examples, platform 20 includes a conveyor and/or rollers. Platform 20 may include wheels and a locking mechanism for moving platform 20 from position to position and selectively fixing it in place. However, in some examples, platform 20 is fixed in position.

Figure 2:
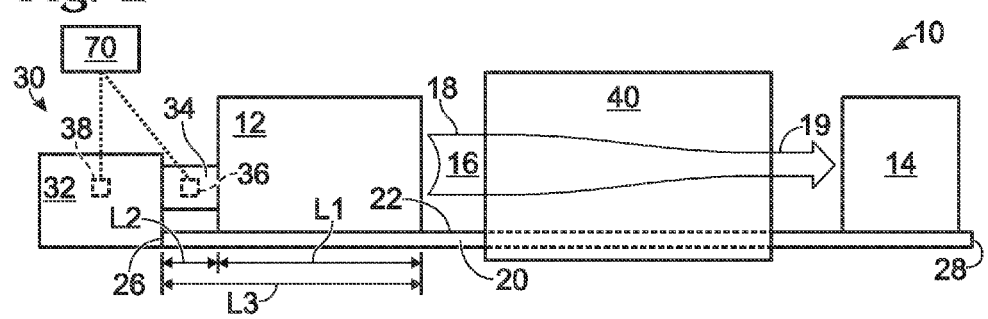
FIG. 2 is a schematic side elevation view of the bailing system of FIG. 1.

Movement mechanism 30 functions to move material 12 along path 16. As shown in FIGS. 1 and 2, movement mechanism 30 may include an arm actuator 32 and an arm 34. Arm actuator 32 may function to extend and retract arm 34. For example, arm actuator 32 is shown in FIGS. 1 and 2 to extend arm 34 from an upstream position in path 16 to a downstream position. Arm actuator 32 may retract arm 34 in an opposite direction.

Arm actuator 32 may be any device known in the art for extending an arm. For example, arm actuator 32 may be a hydraulic cylinder, a motor, and engine, or a pneumatic device. Arm 34 may be selected to be sufficiently rigid to withstand the compressive or tension forces necessary push or pull a desired quantity of material 12. In examples where arm actuator 32 is a hydraulic cylinder, arm 34 may be a hydraulic rod.

Movement mechanism 30 may include a first sensor 36 for collecting arm position data. The arm position data may relate to the position of arm 34 relative to arm actuator 32 or to platform 20, such as relative to upstream end 26 of platform 20. In some examples, arm position data determines an arm extension length L2 in which arm 34 has extended, as shown in FIG. 2. Collection of the arm position data may occur dynamically; that is, first sensor 36 may repeatedly collect arm position data in relatively short time increments as arm 34 extends or retracts. In this manner, the arm position data may be considered dynamic arm position data.

First sensor 36 may be mounted in a variety of positions. For example, as shown in FIGS. 1 and 2, first sensor 36 may be mounted to arm 34. Alternatively, first sensor 36 may be mounted to another component of bailing system 10, such as platform 20, arm actuator 32, or compactor 40, in a position where it can sense the position of arm 34. First sensor 36 may be in wired or wireless communication with controller 70 for sending and receiving data.

In some examples, first sensor 36 includes a temposonic sensor, which is also known as temposonic transducer. The temposonic sensor may include a sensor tube coupled to the arm and that is configured to move with the arm. In some examples, the sensor tube is the arm itself. The temposonic sensor may include a magnet, which produces a magnetic field and that is mounted to the sensor tube. The temposonic sensor may include a current generator in electrical communication with a first end of the sensor tube and that sends a current pulse down the sensor tube to the magnet. When the current pulse approaches the magnet, it may interact with the magnetic field and generate a strain pulse that travels to a receiver in electrical communication with the first end of the tube. The temposonic sensor may include a sensor controller including computer executable instructions to determine the position of the magnet, and hence the position of the arm, based on the time it takes for the strain pulse to reach the receiver.

As shown in FIGS. 1 and 2, movement mechanism 30 may include a second sensor 38 for collecting dynamic movement parameter data. Second sensor 38 may be mounted in a variety of positions, including arm actuator 32, arm 34, platform 20, or compactor 40. In the example shown in FIGS. 1 and 2, second sensor 38 is mounted to arm actuator 32. Second sensor 38 may be in wired or wireless communication with controller 70 for sending and receiving data.

The movement parameter data may include a variety of parameters relating to the movement of arm 34. For example, the movement parameter data may include the force or pressure applied to arm 34 by arm actuator 32 to move arm 34. In some examples, the movement parameter data includes the rate at which arm 34 moves. The temperature of various components of arm actuator 32 and/or arm 34 may also be included in the movement parameter data. To obtain dynamic movement parameter data, second sensor 38 may repeatedly collect movement parameter data in relatively short time increments.

Second sensor 38 may include components appropriate for collecting a given type of movement parameter data. For example, when the movement parameter data includes the force or pressure required to move arm 34, second sensor 38 may include a pressure transducer for collecting pressure data. When the movement parameter data includes the temperature of a component, second sensor 38 may include a thermometer or thermocouple. When the movement parameter data includes multiple parameters, second sensor 38 may include multiple components.

As shown in FIGS. 1 and 2, bailing system 10 may include a compactor 40 for compacting material 40. Compactor 40 may be mounted downstream of movement mechanism 30, and movement mechanism 30 may move material 12 to compactor 40. In some examples, compactor 40 is configured to compact material 12 in a single dimension, such as a length dimension, while in other examples, compactor 40 is configured to compact material 12 in multiple dimensions.

Bailing system 10 may include a controller 70 in wired or wireless communication with movement mechanism 30, such as in wired or wireless communication with first sensor 36 and/or second sensor 38. Controller 70 may include one or more sets of computer executable instructions for determining different parameters of interest. For example, controller 70 may include instructions for determining a material length L1.

The instructions for determining material length L1 may include instructions to compare the dynamic arm position data with the dynamic movement parameter data. For example, the instructions may include instructions to select the dynamic arm position data corresponding to when the dynamic movement pressure changes by a predetermined amount.

In some examples, controller 70 includes instructions to select the arm position data corresponding to a predetermined change in the pressure required to move arm 34 as measured by the second sensor pressure transducer. For example, the instructions may include instructions to select the arm position data corresponding to a predetermined increase in the pressure required to move arm 34. The predetermined increase in pressure may be a given difference in pressure, such as an increase of 500 psi from an initial operating state, or the predetermined increase may be an increase of pressure that crosses a threshold pressure, such as 1,800 psi. The increase in pressure may correspond to material 12 contacting a component of bailing system 10 as it is being moved along path 16 by arm 34.

To determine material length L1, controller 70 may include length determination instructions. The length determination instructions may include instructions to subtract arm extension length L2 from a feed chamber length L3. As can be seen in FIG. 2, feed chamber length L3 may correspond to the length between upstream platform end 26 and a given point downstream. In some examples, the given point downstream coincides with the position of other components of the bailing system, such as segmentation devices, cutting devices, or compactor 40. In the example shown in FIG. 2, material length L1 plus arm extension length L2 equals feed chamber length L3.

Figure 3:
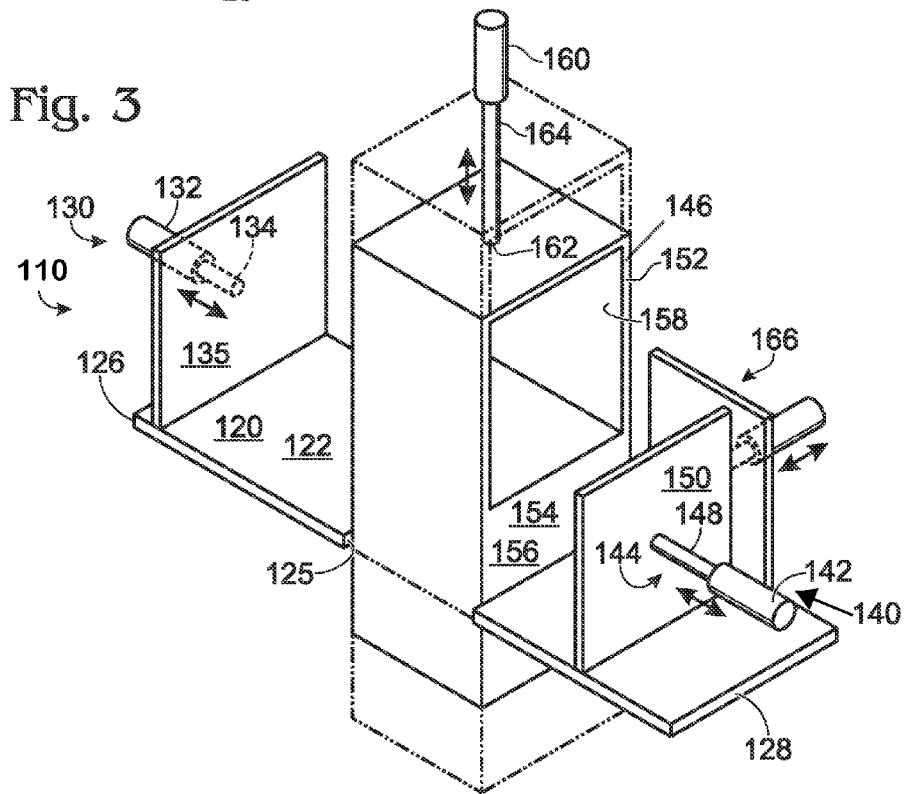
FIG. 3 is a perspective view of a bailing system including a movement mechanism and a compactor including a rolling block.

Turning attention now to FIG. 3, a further example of a bailing system 110 is provided. Bailing system 110 may include a platform 120, a movement mechanism 130, a compactor 140, and a controller (not shown).

As shown in FIG. 3, movement mechanism 130 includes an arm actuator 132, an arm 134, and a push plate 135. Movement mechanism 130 functions to move a material along a path from an upstream platform end 126 toward a down stream platform end 128. Push plate 135 may be sized to exert moving force over at least a substantial portion of a face of the material.

Compactor 140 may include a ram actuator 142, a ram 144, and a rolling block 146. Ram actuator 142 may extend ram 144 toward rolling block 146 to compress the material against rolling block 146. In the example shown in FIG. 3, ram actuator 142 is a hydraulic cylinder, and ram 144 includes a rod 148 and a ram plate 150.

As shown in FIG. 3, rolling block 146 may be interposed between movement mechanism 130 and ram 144. Rolling block 146 shown in FIG. 3 includes a passageway portion 152 and a bolster plate portion 154. In the example shown in FIG. 3, passageway portion 152 is disposed above bolster plate portion 154. In other examples, passageway portion 152 may disposed horizontally to the side of bolster plate portion 154.

Bolster plate portion 154 may include a rigid surface 156 against which the material can be compressed by ram 144. Passageway portion 152 may include an aperture 158 extending through rolling block 146. Aperture 158 may be sized to allow the material to pass through rolling block 146.

In some examples, rolling block 146 is configured to move between a passageway position and a ram position. In the passageway position, the passageway portion of rolling block 146 may be disposed in the path such that the material can move along a surface 122 of platform 120 through rolling block 146 toward ram actuator 142. In the ram position, bolster plate portion 154 of rolling block 146 may be disposed in the path such that ram 144 can compress the material against rigid surface 156 as ram 144 extends from ram actuator 142.

To move rolling block 146 between the passageway position and the ram position, compactor 140 may include a rolling block actuator 160. In the example shown in FIG. 3, rolling block actuator 160 is configured to raise and lower rolling block 146 and is disposed above rolling block 146. Additionally or alternatively, rolling block actuator 160 may act on rolling block 146 from below.

Rolling block actuator 160 may include a winch or a hydraulic press or lift, among other types of mechanical lifting devices. As shown in FIG. 3, rolling block 146 may include a securement point 160 to which a rod 164 may secure. In other examples, rolling block actuator 160 may include an elongate tension bearing member that secures to rolling block 146 through a welded union or a mechanical fastener.

Platform 120 may include a platform aperture 125 to receive rolling block 146 when it is in the passageway position. Additionally or alternatively, compactor 140 may include a second platform positioned downstream of the rolling block and spaced from platform 120 a distance sufficient for rolling block 146 to move between the platforms.

As shown in FIG. 3, compactor 140 includes a pusher 166 for ejecting bales from the compactor. Pusher 166 is configured to move the bales transverse to the path the movement mechanism moves the material. Pusher 166 may be operatively connected with a controller to sequence its operation with the operation of ram 144.

Figure 4:
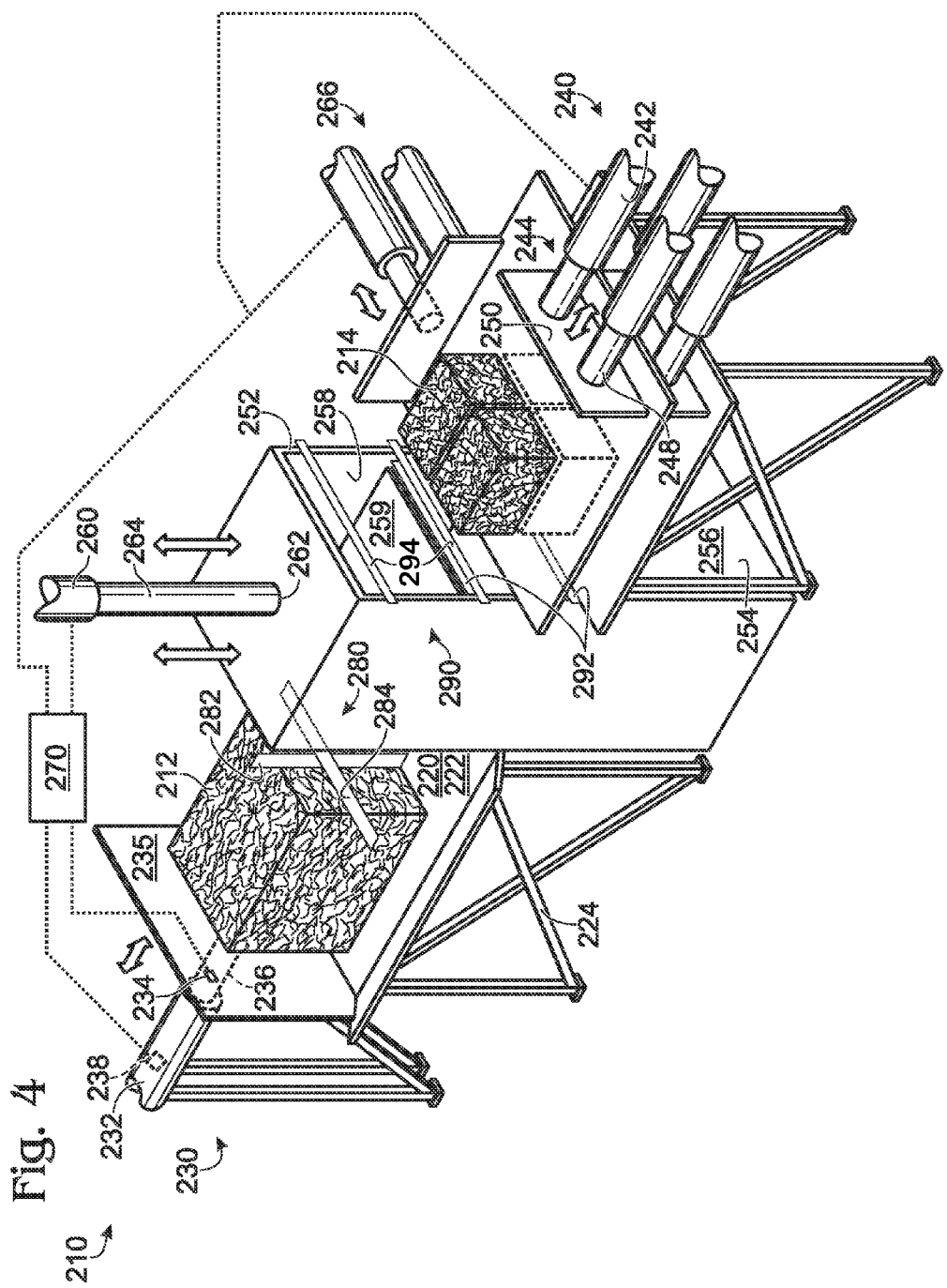
FIG. 4 is a perspective view of a bailing system including a movement mechanism, a cutting device, and a compactor including a rolling block.
Figure 5:
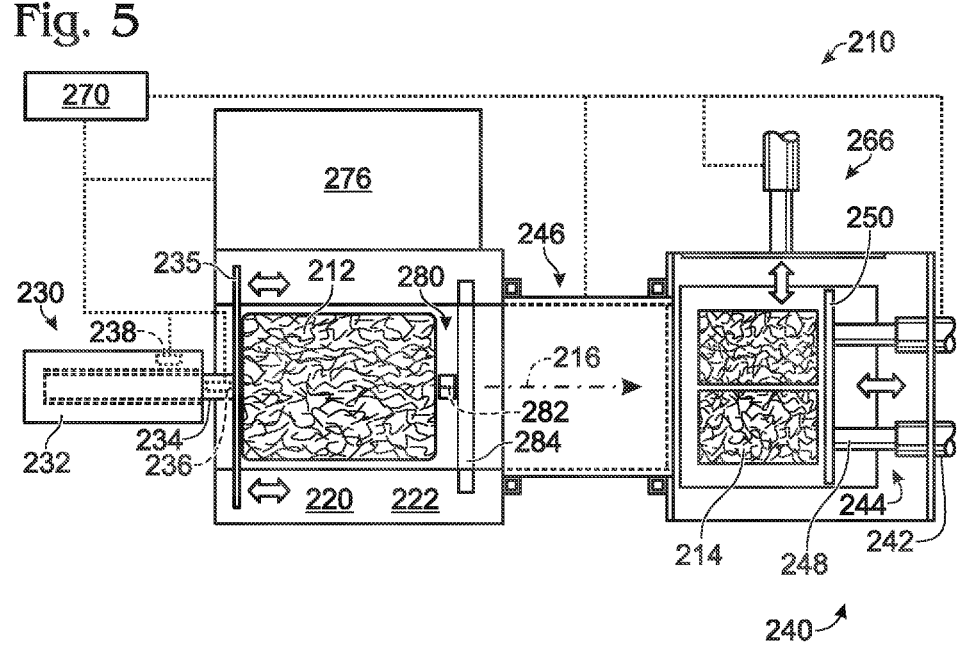
FIG. 5 is a plan view of the bailing system of FIG. 4.
Figure 6:
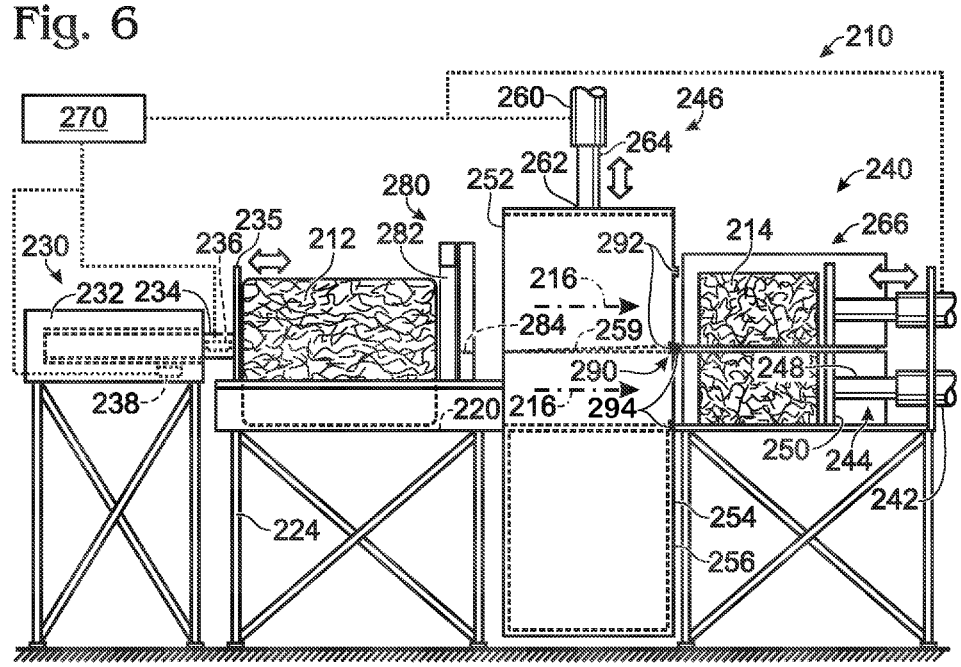
FIG. 6 is a side elevation view of the bailing system of claim 4.

Turning attention now to FIGS. 4-6, a further example of a baling system 210 is shown. Bailing system 210 may include a platform 220, a movement mechanism 230, a compactor 240, a controller 270, a scale 276, a segmentation device 280, and a cutting device 290. A path 216 may be defined in which the material moves between components of bailing system 210. Supports 224 are shown to support surface 222 of platform 220 from the ground.

Compactor 240 may be similar to compactors 40 and 140 described above, and thus, will not be discussed again in detail for the sake of brevity. However, it should be noted that a ram actuator 242 and a rolling block actuator 260 may be in wired or wireless communication with controller 270. Through communication with controller 270, rolling block actuator 260 may extend and retract arm 264 coupled to rolling block 246 at a securement point 262. Similarly, through communication with controller 270, ram actuator 242 may extend and retract a rod 248 supporting a ram plate 250 to compact material 212 against a rigid surface 256 of a bolster plate portion 254 of rolling block 246.

Compactor 240 may include more than one ram actuator 242 and more than one ram 244. The example shown in FIGS. 4-6 includes four ram actuators 242 and four rams 244. In the example shown in FIGS. 4-6, ram actuators 242 and rams 244 are positioned two across and two high. In other examples, the ram and ram actuators may be positioned entirely in a side-by-side configuration, entirely in a vertical stacked arrangement, or some combination thereof.

As shown in FIGS. 4-6, bailing system 210 may include a segmentation device 280 for segmenting material 212 into segments. Segmentation device 280 shown in FIGS. 4-6 includes a width segmentation device 282 for segmenting material 212 in a width dimension. Additionally or alternatively, segmentation device 280 may include a height segmentation device 284 for segmenting material 212 in a height dimension. In the example shown in FIGS. 4-6, width segmentation device 282 is positioned upstream of height segmentation device 284. Alternatively, in some examples height and/or width segmentation devices 282, 284 are configured to move relative to material 212 to segment it.

In the example shown in FIGS. 4-6, the height and width segmentation devices 282, 284 are substantially centered in their respective dimensions to substantially segment or bifurcate material 212 in half in each respective dimension. Alternatively, height and width segmentation devices 282, 284 may be positioned off-center of material 212 in their respective dimensions.

Height and width segmentation devices 282, 284 shown in FIGS. 4-6 include fixed blades or knives to segment the material. Additionally or alternatively, height and width segmentation devices 282, 284 may include saws, such as bandsaws, rotary saws, reciprocating saws, or the like. In some examples, height and width segmentation devices 282, 284 include dies.

A cutting device 290 may be included to cut material 212 to a given length. Cutting device 290 may include knives, blades, saws, bandsaws, rotary saws, or the like. In the example shown in FIGS. 4-6, cutting device 290 includes four knives 292, 294, arranged into two sets of two opposed and facing knives. In some examples (not shown), cutting device 290 includes additional knives to segment material 212 in a length dimension.

Movement of rolling block 246 may cause cutting device 290 to cut material 212 to a given length. In cutting device 290 shown in FIGS. 4-6, each set of opposed knives includes a first knife 292 mounted to the rolling block and oriented upward. The set further includes a second knife 294 mounted to a fixed point of the compactor and oriented downward. In bailing system 210 shown in FIGS. 4-6, a scissors type cutting action occurs when upward movement of rolling block 246 moves first knifes 292 relative to second knives 294, which are fixed in position.

As shown in FIGS. 4 and 6, rolling block 246 may include a spacer 259 mounted within an aperture 258 of passageway portion 252. In the example shown in FIGS. 4-6, spacer 259 functions to create space between the upper and lower segments of the material. The space created allows material 212 to move through rolling block 246 without being impeded by knives 292, 294 of cutting device 290. Further, spacer 259 guides the upper segments of material 212 to an upper chamber of compacter 240. Spacer 240 may include a ramped portion and may be mounted at a height sufficient to allow the upper segments of material 212 to pass over the lower of the two second knives 294 shown in FIGS. 4 and 6.

As shown in FIGS. 4-6, compactor 240 may include a pusher 266 for ejecting bales 214 from the compactor. In the example shown in FIGS. 4-6, upper and lower pushers are provided to eject bales 214 from upper and lower compaction chambers, respectively.

As shown in FIG. 5, bailing system 210 may include a scale 276 to weigh material 212. In the example shown in FIGS. 4-6, scale 276 is positioned adjacent platform 220. However, in some examples the scale is integral with the platform or serves as the platform. Scale 276 may be in wired or wireless communication with controller 270 to communicate the weight of material 212 to controller 270. Additionally or alternatively, a user may manually input the weight into controller 270.

Controller 270 may include any or all of the computer executable instructions discussed above with regard to controller 70 of bailing system. Additionally or alternatively, controller 270 may include instructions for determining a length-to-weight ratio of material 212. To determine a length-to-weight ratio of material 212, controller 270 may include instructions to divide the length of material 212 by the weight of material 212 obtained from scale 276.

To determine the length of the material 212, as discussed above, controller 270 may include instructions to select dynamic arm position data corresponding to when the dynamic movement pressure changes by a predetermined amount. In the example shown in FIGS. 4-6, the movement pressure increases by a predetermined amount when material 212 is moved against width segmentation device 282. The extra pressure required to move material 212 past width segmentation device 282 signals controller 270 to select the dynamic arm position data at that time and use it to determine the length of material 212.

Additionally or alternatively, controller 270 may include computer executable instructions for controlling components of bailing system 210. For example, controller 270 may include feed instructions to control when, to what position, and/or for how long an arm actuator 232 moves an arm 234 supporting a push plate 235 to move material 212 along path 216. Additionally or alternatively, controller 270 may include rolling block movement instructions for controlling when rolling block actuator 260 moves rolling block 246 between the passageway position and the ram position. Rolling block movement instructions may serve to both facilitate compacting material 212 and cutting material 212 to a given length. Further, controller 270 may include instructions to control when ram actuator 242 extends ram 244 to compact material 212.

Controller 270 may include sequence instructions for sequencing when different components are controlled to achieve a given result. For example, the sequence instructions may sequence the timing and execution of the feed instructions and the rolling block movement instructions. In some examples, the sequence instructions cause a given length or a given weight of material 212 to be fed to compactor 240.

To feed a given length or weight of material 212 to the compactor, such as, for example, through use of a determined length-to-weight ratio of material 212, the sequence instructions may operate as follows: 1) Execute the rolling block instructions to move rolling block 246 into the passageway position; 2) execute the feed instructions to feed material 212 until first and second sensors 236, 238 indicate that a given length of material 212 has been fed through the passageway portion 252 of rolling block 246 past cutting device 290; and 3) execute the rolling block instructions to move rolling block 246 to the ram position and thereby cut material 212 to the given length. Additional or alternative sequences may be used in different examples.

Figure 7:
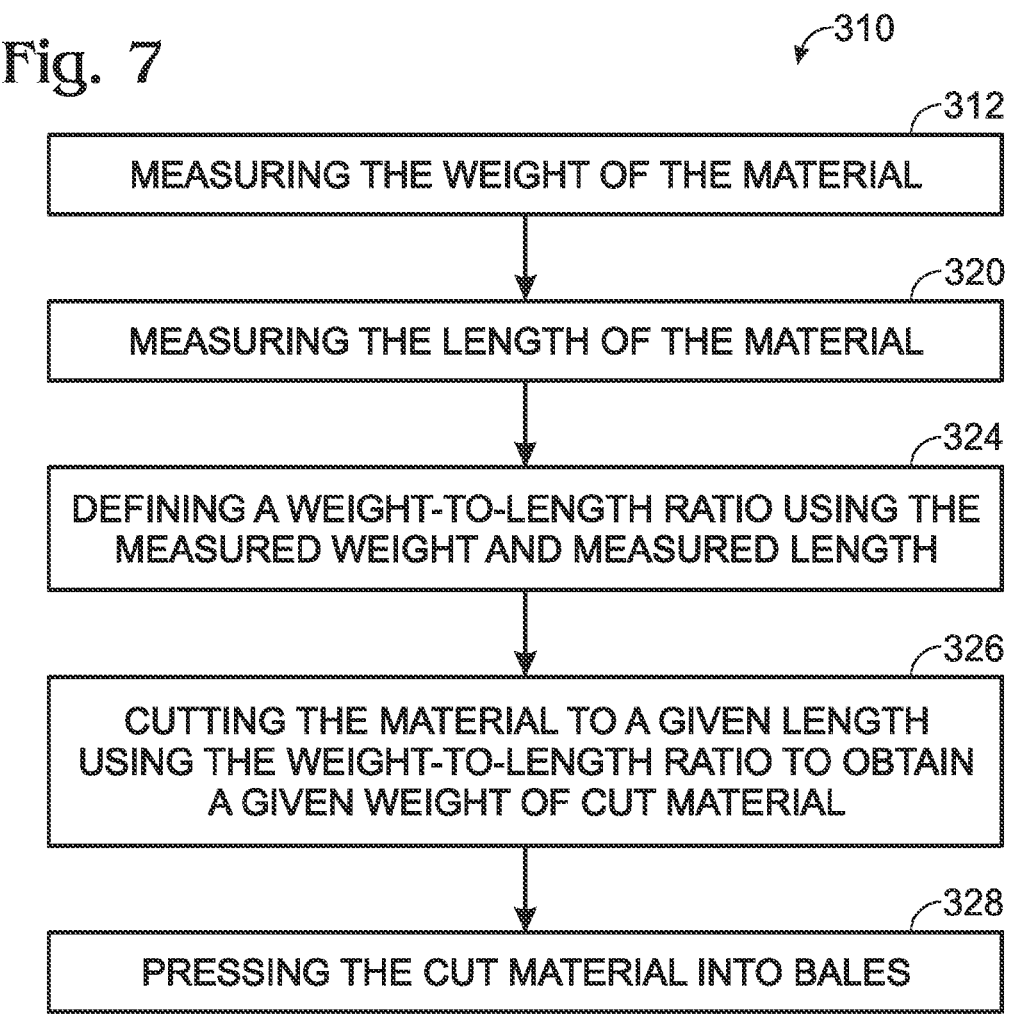
FIG. 7 is a flow chart of a method of bailing a material into bales.

Shifting attention to FIG. 7, a method of bailing a material 310 will be discussed. Method of bailing a material 310 shown in FIG. 7 includes measuring the weight of the material 312, measuring the length of the material 320, and defining a weight-to-length ratio using the measured weight and measured length 324. Method of baling a material 310 further includes cutting the material to a given length using the weight-to-length ratio to obtain a given weight of cut material 326. As further shown in FIG. 7, method 310 may include pressing the cut material into bales 328.

Measuring the weight of material 312 may be performed by any conventional means known in the art, such as with a scale. In some examples, the weight is measured continuously as the material moves along a path. In other examples, the material is temporarily held stationary on a scale to obtain its weight.

Similarly, measuring the length of the material 320 may be accomplished by any conventional means known in the art. For example, the length may be measured with tape measures, marked gradations on a platform, or with optical length measuring devices. A further example for measuring the length is discussed below in reference to the method of bailing a material shown in FIG. 8.

The measured weight and length may be communicated to a computer or a controller to calculate a weight-to-length ratio 324. In some examples, a series of measured weights and/or lengths are communicated and statistical means are employed, such as to obtain average, mean, median, or mode values, among other values that may be relevant, to calculate the weight-to-length ratio. Additionally or alternatively, a user may manually determine the weight-to-length ratio.

The weight-to-length ratio provides a means to obtain a given weight of the material by cutting the material to a given length. The user may input a desired weight into a computer or controller, such as 120 pounds, and the computer may perform mathematical operations to determine how much length of material will yield the desired or given weight. For example, the computer may divide the given weight by the weight-to-length ratio to obtain a given length to which the material should be cut.

The material may be cut 326 by any conventional means, such as with knives, saws, cutting torches, or laser cutting devices. In some examples, the material is cut in a scissors action by opposed and facing knife blades that move relative to one another. For example, an upward pointing knife blade may be mounted to a moving rolling block and move relative to a stationary mounted downward pointing knife blade when the rolling block moves upward.

The material may be compressed into bales 328 using any conventional compaction means known in the art. For example, compactors, rams, and presses may be used. Hydraulic devices, electric motors, and fuel fed engines may be used to drive the compactors, rams, and/or presses. Compaction may occur after the material is cut or before it is cut. In some examples, the material is not compressed at all. Further, the material may be bound with a suitable binding member by any conventional binding means, but need not be bound in all instances.

A further method for bailing a material 410 is shown in FIG. 8. Method of bailing a material 410 shown in FIG. 8 includes measuring the weight of the material 412, which may be accomplished in the same manner as discussed above with regard to the method of FIG. 7. As shown in FIG. 8, method 410 may include moving the material toward a segmentation device 412 positioned an initial distance from a trailing face of the material and measuring the moving pressure 416 required to move the material. Method 410 further includes measuring a moved distance 418 corresponding to the distance the material is moved for a leading face of the material to reach the segmentation device.

FIG. 8 further shows that method 410 includes measuring the length of the material 420 and segmenting the material 422. In a manner similar to method 310 shown in FIG. 7, method 410 shown in FIG. 8 includes determining a weight-to-length ratio using the measured weight and the measured length 424. Further similar to method 310, method 410 includes cutting the material to a given length using the weight-to-length ratio to obtain a given weight of cut material 426. Method 410 also includes pressing the material into bales 428.

For point of reference purposes, the material may be defined as having a trailing face and a leading face. The trailing face may be proximate an upstream side of a path on which the material moves. The leading face may be proximate a downstream side of the path on an opposite side of the material from the trailing face. In some examples, the leading face faces a segmentation device.

The length may be determined 420 by comparing an initial distance and a moved distance, such as subtracting the initial distance from the moved distance. The initial distance and the moved distances are described below. The length may be calculated automatically by a controller or a computer.

The initial distance may equal the distance between the segmentation device, such as a segmenting edge of the segmentation device, and the trailing face of the material. In some examples, the initial distance is calculated based on the position of the material prior to the material being moved toward the segmentation device 414. Additionally or alternatively, differential initial distances may be dynamically calculated as the material moves toward the segmentation device and the greatest differential initial distance may be selected as the initial distance. The initial distance may be communicated to a controller or a computer.

The moved distance may be defined to be the distance the material is moved to reach the segmentation device, such as a segmentation edge of the segmentation device. Any conventional means to determine how far the material has been moved to reach the segmentation device 418, such as rulers, gradations on a platform, or optical distance measuring devices, may be used. Additionally or alternatively, a temposonic sensor device (a.k.a. a temposonic transducer device) may be employed to determine how far an arm of a moving device has extended to move the material. The moved distance may be communicated to a controller or a computer.

To signal when the material has reached the segmentation device, a moving pressure applied to move the material may be dynamically measured 416. A predetermined change in the moving pressure may then be used to signal when the material has reached the segmentation device. For example, a predetermined increase in the pressure due to the material pressing against the segmentation device signal a controller when to determine the moved distance. Additionally or alternatively, differential moved distances may be dynamically determined and the differential moved distance corresponding to when the predetermined change in the moving pressure occurs may be selected as the moved distance. To measure the moving pressure 416, a pressure transducer operatively connected to a moving device may be provided.

Segmenting the material 422 may be accomplished by moving the material past a fixed segmentation device. For example, the material may be moved passed a fixed knife, a rotating saw blade, or a reciprocating saw. Additionally or alternatively, segmenting the material 422 may occur by moving a segmentation device relative to the material.

Determining a weight-to-length ratio using the measured weight and the measured length 424, cutting the material to a given length using the weight-to-length ratio to obtain a given weight of cut material 426, and pressing the material into bales 428 may be accomplished in similar or identical manners as discussed above with regard to method 310. Accordingly, for the sake of brevity, they will not be discussed again further here. However, the reader should understand that the steps need not be the same or similar in all instances.

It is believed that the disclosure set forth above encompasses multiple distinct inventions with independent utility. While each of these inventions has been disclosed in a particular form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein, and equivalents of them. Where the disclosure or subsequently filed claims recite "a" or "a first" element or the equivalent thereof, it is within the scope of the present inventions that such disclosure or claims may be understood to include incorporation of one or more such elements, neither requiring nor excluding two or more such elements.

Applicants reserve the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A bailing system for bailing a material into bales along a feed path, comprising:
    a movement mechanism including:
        an arm configured to move the material along the feed path,
        a first sensor configured to collect dynamic arm position data, and
        a second sensor configured to collect dynamic movement parameter data;
    a compactor disposed in the feed path downstream of the movement mechanism and configured to compact the material into bales; and
    a controller in wired or wireless communication with the movement mechanism, the controller including computer executable instructions for determining the length of the material by comparing the dynamic arm position data and the dynamic movement parameter data.

2. The bailing system of claim 1, further comprising a scale configured to weigh the material, wherein the controller further includes computer executable instructions for determining a weight-to-length ratio of the material.

3. The bailing system of claim 2, wherein the controller further comprises computer executable instructions for controlling the movement mechanism to move a given length of material into the compactor to compact the material into bales having a given weight.

4. The bailing system of claim 3, further comprising a cutting device in wired or wireless communication with the controller and configured to cut the material, wherein with the controller further includes computer executable instructions for controlling the cutting device to cut the material to a given length.

5. The bailing system of claim 1, wherein the first sensor is a temposonic sensor.

6. The bailing system of claim 1, wherein the second sensor is a pressure transducer.

7. The bailing system of claim 6, wherein the movement parameter data includes a dynamic movement pressure corresponding to the pressure supplied by the movement mechanism to move the material.

8. The bailing system of claim 7, wherein the computer executable instructions for determining the length of the material includes selecting the arm position data corresponding to when the dynamic movement pressure changes by a predetermined amount.

9. The bailing system of claim 1, wherein the material includes hay.

10. The bailing system of claim 1, wherein the compactor includes:
- a ram configured to extend in a compaction path to compact the material into bales;
- a block having a passageway portion and a bolster plate portion, and
- an actuator configured to move the block between a passageway position and a ram position, where:
    - in the passageway position, the passageway portion is disposed in the feed path allowing the movement mechanism to move the material through the passageway portion into the compactor, and
    - in the ram position, the bolster plate is disposed in the compaction path of the ram.

11. The bailing system of claim 10, wherein the actuator is configured to move the block transverse to the feed path.

12. The bailing system of claim 10, further comprising a cutting mechanism supported by the block and configured to cut the material.

13. The bailing system of claim 12, wherein the block includes a recess formed into the bolster plate portion and the cutting mechanism is supported within the recess.

14. The bailing system of claim 13, wherein the cutting mechanism is configured to cut the material as the block moves between the passageway position and the ram position.

15. The bailing system of claim 4, wherein the computer executable instructions of the controller include instructions to:
- measure the weight of the material to define a measured weight;
- measure the length of the material to define a measured length;
- determine a weight-to-length ratio using the measured weight and measured length; and
- cut the material to a given length using the weight-to-length ratio to obtain a given weight of cut material.

16. The bailing system of claim 15, further comprising a segmentation device configured to segment the material into segments, wherein the computer executable instructions to measure the length of the material includes measuring the length of the material upon segmenting the material into segments.

17. The bailing system of claim 16, wherein:
- the material includes a leading face and a trailing face opposite the leading face;
- the distance between the trailing face and the segmentation device when the material is initially contacted by the arm to move the material toward the segmentation device defines an initial distance;
- the distance between the trailing face and the segmentation device when the leading face contacts the segmentation device defines a moved distance; and
- and the computer executable instructions further comprise instructions for dynamically measuring the moved distance.

18. The bailing system of claim 17, wherein the computer executable instructions for dynamically measuring the moved distance include instructions for subtracting the moved distance from the initial distance.

19. The bailing system of claim 17, wherein the computer executable instructions further comprise instructions for:
- dynamically measuring a moving pressure applied by the arm to move the material; and
- detecting when a predetermined change in the moving pressure occurs to determine when the material has moved the moved distance.

20. The bailing system of claim 19, wherein the predetermined change in the moving pressure is an increase in the moving pressure corresponding to the leading face being pressed into the segmentation device by the arm.

* * * * *